United States Patent
Greenberg et al.

(10) Patent No.: US 8,477,650 B2
(45) Date of Patent: Jul. 2, 2013

(54) POWER MANAGEMENT FOR PASSIVE OPTICAL NETWORKS

(75) Inventors: Daniel Greenberg, Rishon-Lezion (IL); Oren Spector, Haifa (IL)

(73) Assignee: Oliver Solutions Ltd., Herzliya (IL)

( * ) Notice: Subject to any disclaimer, the term of this patent is extended or adjusted under 35 U.S.C. 154(b) by 212 days.

(21) Appl. No.: 13/158,674

(22) Filed: Jun. 13, 2011

(65) Prior Publication Data

US 2012/0063780 A1 Mar. 15, 2012

Related U.S. Application Data

(60) Provisional application No. 61/381,452, filed on Sep. 10, 2010.

(51) Int. Cl.
*G01R 31/08* (2006.01)

(52) U.S. Cl.
USPC .............................................. 370/252; 398/58

(58) Field of Classification Search
USPC ............... 398/25, 38, 58, 66, 67, 72, 98, 139, 398/159; 370/252, 498
See application file for complete search history.

(56) References Cited

U.S. PATENT DOCUMENTS

2010/0111523 A1* 5/2010 Hirth et al. ....................... 398/25

OTHER PUBLICATIONS

ITU-T, "gigabit-capable Passive Optical Networks (G-PON): ONT management and control interface specification", G.984.4, Feb. 2008, total pp. 430.*

* cited by examiner

*Primary Examiner* — Jeffrey M Rutkowski
*Assistant Examiner* — Peter Mak
(74) *Attorney, Agent, or Firm* — Soquel Group LLC

(57) ABSTRACT

A power manager for a passive optical network, including a network statistics collector, for collecting data regarding traffic in a passive optical network (PON) including a plurality of optical network units (ONUs) on the downstream side of the PON, wherein each ONU can be in at least a sleep state and an active state, and wherein the PON transmits data in packets of data frames, a buffer for storing downstream data frames for each ONU while the ONU is in the sleep state, an activity detector for processing the data collected by the network statistics collector to generate indicators of activity levels for each ONU, and a protocol manager including a plurality of state machines for the respective plurality of ONUs, wherein each state machine governs state transition of its respective ONU to the sleep state when the activity detector indicates a low activity level for the ONU, and to the active state when the activity detector indicates a high level of activity for the ONU.

17 Claims, 9 Drawing Sheets

POWER MANAGEMENT FOR PASSIVE OPTICAL NETWORKS

CROSS REFERENCES TO RELATED APPLICATIONS

This application claims priority benefit of U.S. Provisional Application No. 61/381,452, entitled NOVEL APPROACH TO POWER SAVE IN PASSIVE OPTICAL NETWORKS, filed on Sep. 10, 2010 by inventors Danny Greenberg and Oren Spector.

FIELD OF THE INVENTION

The present invention relates to passive optical networks.

BACKGROUND OF THE INVENTION

A passive optical network (PON) is a point-to-multipoint fiber-optic network, in which unpowered optical splitters are used to enable a single optical fiber to service multiple premises, typically 16-128 homes. Reference is made to FIG. 1, which is a simplified diagram of a prior art PON 100. As seen in FIG. 1, PON 100 includes a central office node, referred to as an optical line terminal (OLT) 140, a number of user nodes, referred to as optical network units (ONUs) 120, which are near user premises 130, and fibers 150 and splitters 160 between them.

Data is transmitted within PON 100 in packets referred to as data frames. Downstream signals (i.e., signals transmitted from left to right in FIG. 1) originate from network services, such as an Internet service 110A, a voice over IP service 110B, a cable TV service 110C and other such services 110D. The downstream signals are broadcast to all premises 130 that share a single fiber. Bandwidth for upstream signals (i.e., signals transmitted from right to left in FIG. 1) is allocated by time-division multiplexing among ONUs 120. Current PONs 100 operate at 1 Gbit/s and 2.5 Gbit/s rates, and 10 Gbit/s PONs will be available in the near future.

A drawback of conventional PONs 100 is the large amounts of power that they consume. Moreover, as traffic rates in a PON increase, the power consumption of the PON also increases. As such, as PONs improve to operate at higher rates, the need to reduce their power consumption is ever more pressing.

SUMMARY OF THE DESCRIPTION

Aspects of the present invention relate to methods and systems for managing power for PONs, so as to save energy, reduce heat dissipation, meet power limit regulations, and save operational expenses. The present invention includes a novel hardware architecture, a novel software architecture and application programming interface, and a novel protocol for power management.

Embodiments of the present invention include a distributed power management protocol that runs on the OLT side and on the ONU side of a PON. These embodiments track PON activity, and transition ONUs in and out of power saving states based on activity statistics and configurable parameters.

There is thus provided in accordance with an embodiment of the present invention a power manager for a passive optical network, including a network statistics collector, for collecting data regarding traffic in a passive optical network (PON) including a plurality of optical network units (ONUs) on the downstream side of the PON, wherein each ONU can be in at least a sleep state and an active state, and wherein the PON transmits data in packets of data frames, a buffer for storing downstream data frames for each ONU while the ONU is in the sleep state, an activity detector for processing the data collected by the network statistics collector to generate indicators of activity levels for each ONU, and a protocol manager including a plurality of state machines for the respective plurality of ONUs, wherein each state machine governs state transition of its respective ONU to the sleep state when the activity detector indicates a low activity level for the ONU, and to the active state when the activity detector indicates a high level of activity for the ONU.

There is additionally provided in accordance with an embodiment of the present invention a method for managing power of a passive optical network, including collecting data regarding traffic in a passive optical network (PON) including a plurality of optical network units (ONUs) on the downstream side of the PON, wherein each ONU can be in at least a sleep state and an active state and wherein the PON transmits data in packets of data frames, storing downstream data frames for each ONU in a buffer, while the ONU is in the sleep state, processing the data collected by the collecting to generate indicators of activity levels for each ONU, and determining state transitions of each ONU, wherein an ONU transitions to the sleep state when the indicators of activity level for the ONU indicate a low activity level for the ONU, and an ONU transitions to the active state when the indicators of activity level for the ONU indicate a high level of activity for the ONU.

There is further provided in accordance with an embodiment of the present invention a system for power management of a passive optical network, including a plurality of optical network units (ONUs) on the downstream side of a passive optical network (PON), wherein each ONU transmits data in packets of data frames, wherein each ONU can be in at least a sleep state and an active state, and wherein each ONU includes an ONU network statistics collector, for collecting data regarding traffic at the ONU, an ONU activity detector for processing the data collected by the network statistics collector to generate indicators of activity level of the ONU, and an ONU protocol manager including a state machine for the ONU, wherein the state machine governs state transition of the ONU to the sleep state when the ONU activity detector indicates a low activity level for the ONU, and an optical line terminal (OLT) on the upstream side of the PON, including an OLT network statistics collector, for collecting data regarding traffic at each of the ONUs, an OLT buffer for storing downstream data frames for each ONU while the ONU is in the sleep state, an OLT activity detector for processing the data collected by the OLT network statistics collector to generate indicators of activity levels for each ONU, and an OLT protocol manager including a plurality of state machines for the respective plurality of ONUs, wherein each state machine governs state transition of its respective ONU to the active state when the OLT activity detector indicates a high level of activity for the ONU.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to power management of PONs.

Figure 1:
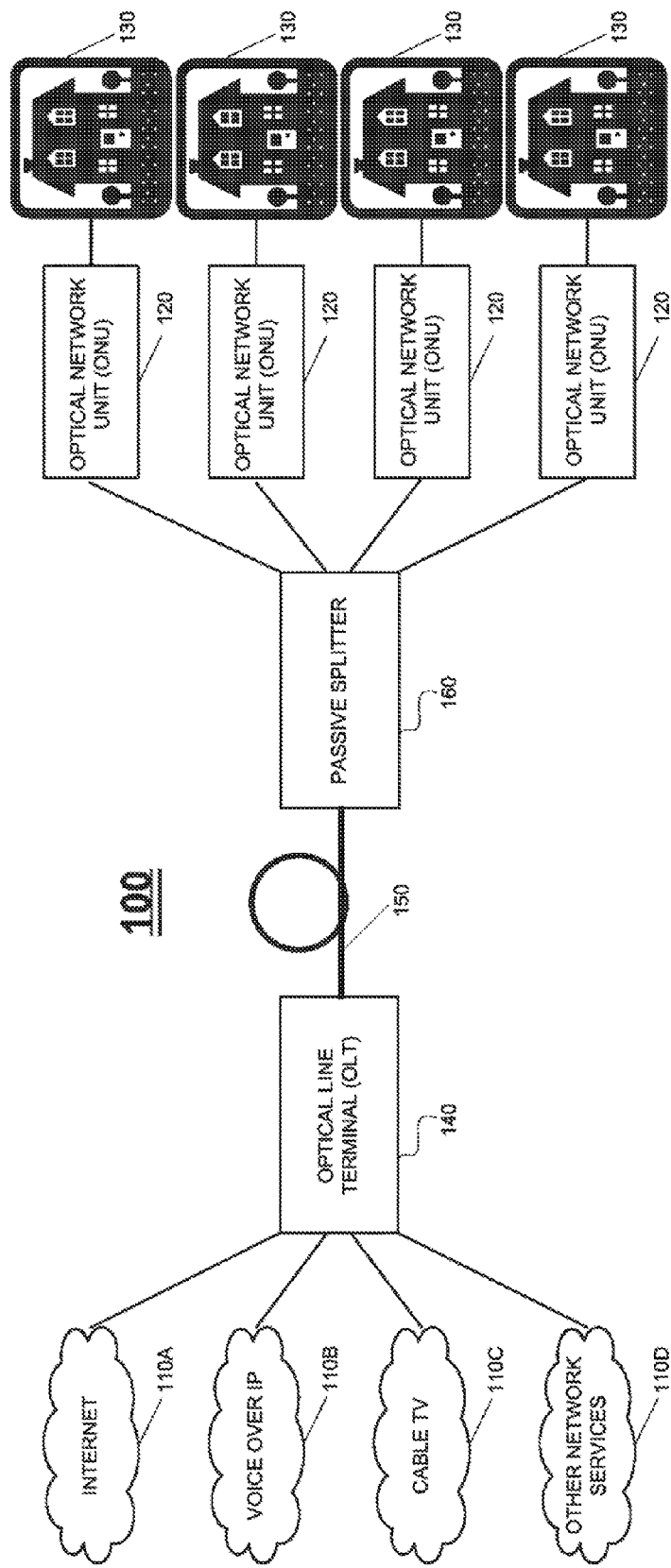
FIG. 1 is a simplified block diagram of a prior art PON.
Figure 2:
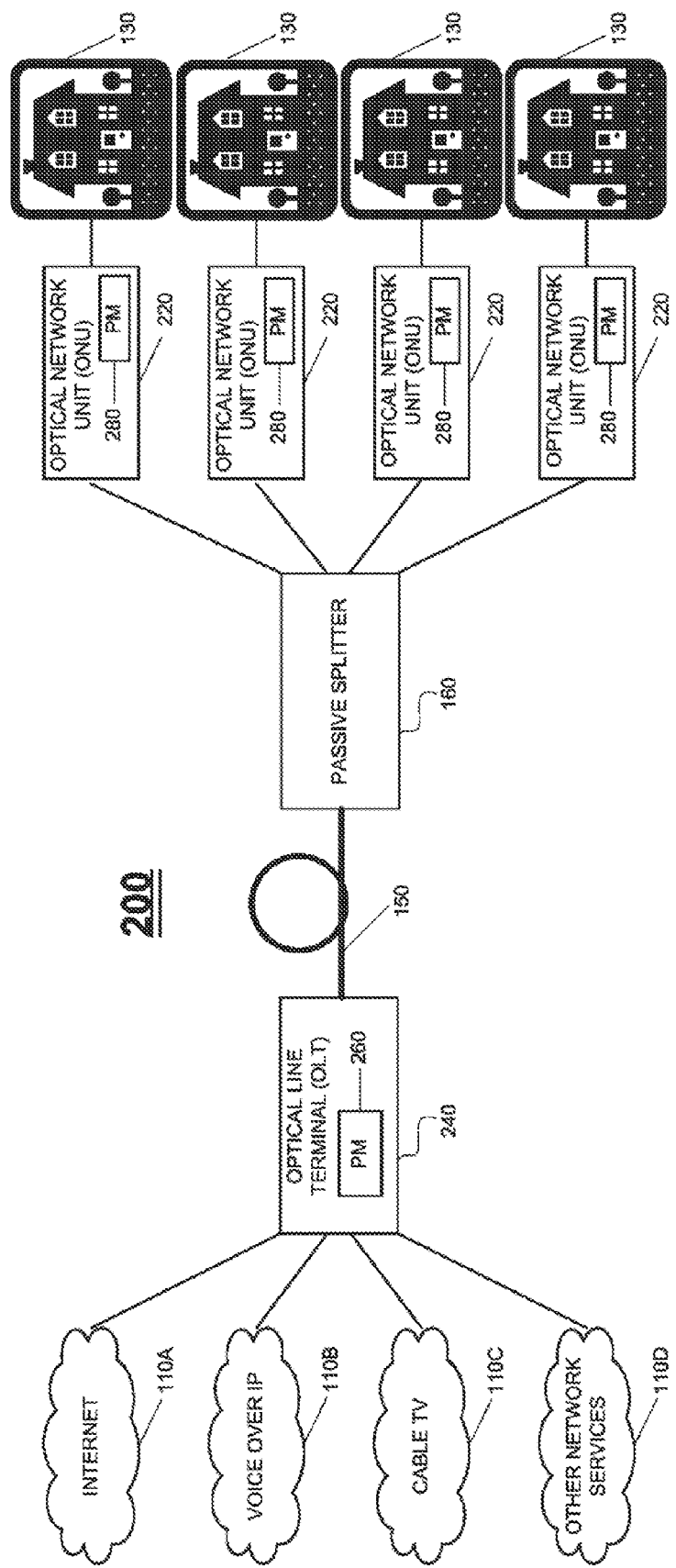
FIG. 2 is a simplified block diagram of an enhanced PON, with power management in accordance with an embodiment of the present invention.

Reference is made to FIG. 2, which is a simplified block diagram of an enhanced PON 200, with power management in accordance with an embodiment of the present invention. PON 200 includes an OLT 240 with a novel power management (PM) module 260, and ONUs 220 with novel PM modules 280.

Each ONU PM module 280 maintains its own state machine, and OLT PM module 260 maintains separate state machines for each ONU 220. Each ONU 220 may operate in one of three possible states; namely, an "Active" state, which is its normal operational state, a "Sleep" state, which is a low-power mode, and an interim "Waking Up" state, during which ONU PM module 280 sends a report regarding its upstream buffer occupancy to OLT PM module 280, and OLT PM module 260 and ONU PM module 280 jointly decide whether ONU 220 should transition to Sleep state or to Active state. The state machines in OLT PM module 260 and ONU PM module 280 are activated periodically. The inputs to each ONU PM state machine include the current state of the ONU, various PON activity statistics described hereinbelow, and system-wide configurable parameters described hereinbelow. The output of each ONU PM state machine includes the next state that the ONU should transition to, and relevant control signals as described hereinbelow.

While one or more ONUs 220 are in Sleep state, downstream, data for the ONUs is stored in one or more buffers/queues in PM module 260, and upstream data for the ONUs is stored in buffers/queues in PM module 280. OLT PM module 260 and ONU PM modules 280 implement logic of a power management protocol described hereinbelow with reference to FIG. 8.

Figure 3:
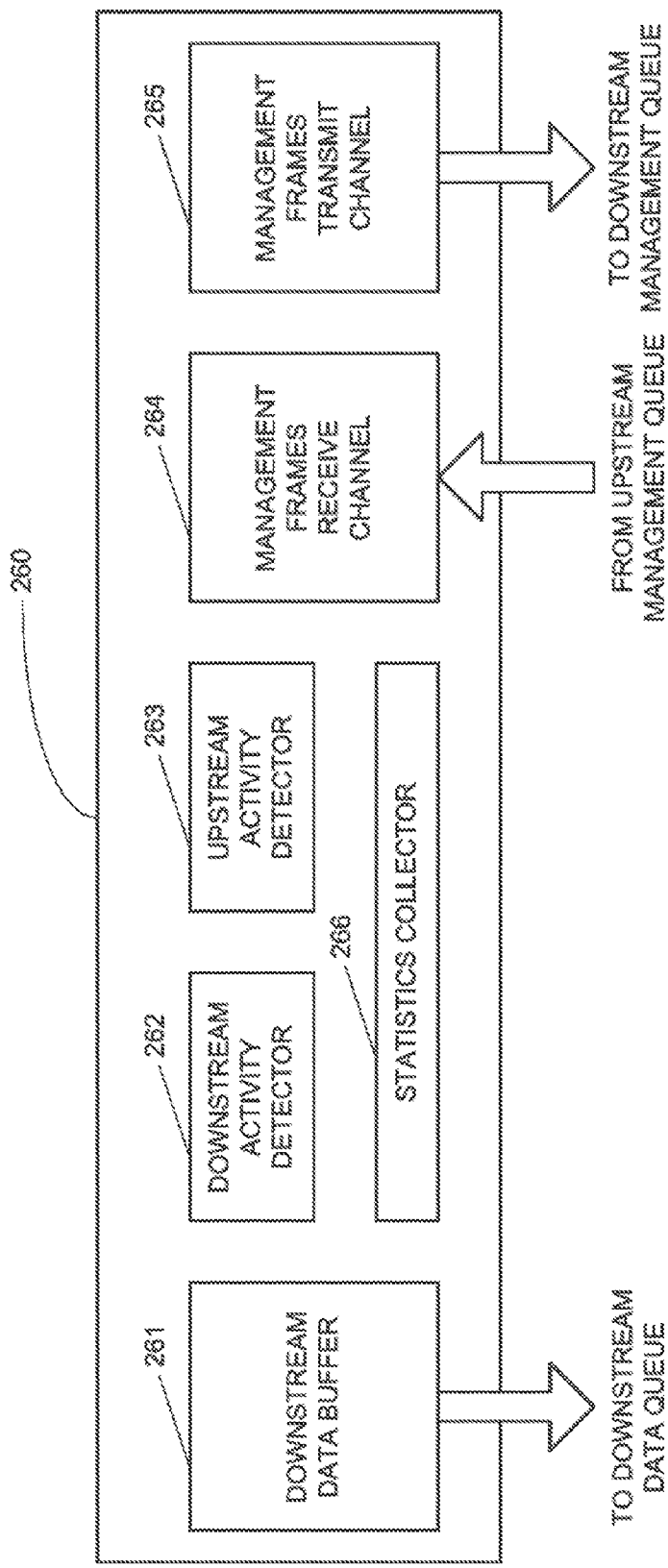
FIG. 3 is a simplified block diagram of an OLT-side power management module, in accordance with an embodiment of the present invention.

Reference is made to FIG. 3, which is a simplified block diagram of OLT PM module 260, in accordance with an embodiment of the present invention. As seen in FIG. 3, OLT PM module 260 includes one or more controllable buffers/queues 261, for storing downstream data for each ONU that is in Sleep state. Storage of data in buffers/queues 261 and extraction of data from buffers/queues 261 is controlled by control signals of the power management protocol described hereinbelow with reference to FIG. 8.

OLT PM module 260 further includes a management data frames receiver channel 264 and a management data frames transmitter channel 265. In accordance with an embodiment of the present invention, power management protocol messages are encapsulated within management data frames. Channels 264 and 265 are hardware buffers for receiving and transmitting such management data frames. OLT PM module 260 writes a management data frame, for downstream transmission to a destination ONU PM module 280, into transmitter channel 265. After writing the complete management data frame, OLT PM module 260 indicates to transmitter channel 265 that the data frame is ready for transmission. Channel 265 then transmits the data frame downstream to the destination ONU PM module 280, at a higher than standard priority.

OLT PM module 260 writes management frame data, arriving from an ONU PM module 280, into receiver channel 264. OLT PM module 260 polls a hardware flag to determine when a complete management data frame is available in receiver channel 264. Alternatively, OLT PM module 260 is interrupted by receiver channel 264 when a complete management data frame is available in receiver channel 264. OLT PM module 260 then reads the content of the received management data channel, and parses the content to extract a power management protocol message.

OLT PM module 260 further includes a statistics collector 266. Statistics collector 266 uses counters and accumulators to track PON data, including the following time series statistics.

Upstream received bytes—bytes received by each ONU 220 from OLT 240

Incoming frames—frames received by each ONU 220 from OLT 240

Downstream received bytes—bytes received by each ONU 220 from premises 130

Outgoing frames—frames prepared by each ONU 220 for upstream transmission

PON clock—time, measured in units of time quanta

OLT Downstream buffer occupancy—number of bytes in downstream data buffer/queue 261

ONU upstream buffer occupancy—number of bytes in each ONU upstream buffer, obtained by parsing each ONU's report messages OLT PM module 260 further includes a downstream activity detector 262 and an upstream activity detector 263, for calculating respective downstream and upstream metrics from the statistical data collected by statistics collector 266. Downstream activity detector 262 generates the following metrics for each ONU 220.

Downstream rate—a decaying time series average of the ONU downstream received bytes, as described hereinbelow Downstream frames gap—a decaying time series average of gaps between ONU outgoing frames, as described hereinbelow Similarly, upstream activity detector 263 generates the following metrics for each ONU 220.

Upstream rate—a decaying time series average of the ONU upstream received bytes, as described hereinbelow Upstream frames gap—a decaying time series average of gaps between ONU incoming frames, as described hereinbelow The downstream and upstream rates are calculated by respective activity detectors 262 and 263 according to the following function.

```
calc_rate( current_rx_bytes, prev_rx_bytes, prev_average )
{
    new_bytes = current_rx_bytes - prev_rx_bytes;
    prev_rx_bytes = rx_bytes;
    prev_average = smoothing_factor * new_bytes +
        (1 - smoothing_factor) * prev_average;
    rate = 8 * prev_average / time_step // in bits per second
    return rate;
}
```

The function calc_rate is called every time_step seconds. The smoothing_factor parameter is a configurable parameter between 0 and 1. The time series of byte arrivals is smoothed by smoothing_factor to derive traffic arrival rates. The time_step parameter is a configurable parameter in units of seconds The downstream and upstream frame gaps are calculated by respective activity detectors 262 and 263 according to the following function.

```
calc_gap( current_rx_bytes, prev_rx_bytes, prev_gap,
prev_average )
{
    if (current_rx_bytes > prev_rx_bytes ) {
        if (smoothing factor == 1.0 ) {
            prev_average = 0;
        } else {
            prev_average = smoothing_factor * prev_gap +
                (1 - smoothing_factor) * prev_average;
        }
        current_average = prev_average;
        prev_gap = 0;
    }
    else {
        prev_gap = prev_gap + time_step;
        current_average = prev_average;
        if ( prev_gap > current_average )
            current_average = smoothing_factor * prev_gap +
                (1 - smoothing_factor) * current_average;
    }
    gap = current_average; // in seconds
    return gap:
}
```

The function calc_rate is also called every time_step seconds. If a new data frame has arrived since the previous call to calc_rate, then prev_gap is reset to zero. Otherwise, prev_gap is incremented by time_step.

Activity detectors 262 and 263 determine state transitions for ONUs 220 based on thresholds of activity. Specifically, an ONU 220 is deemed to have sufficiently low activity to transition to Sleep state at a given time, if the above metrics for ONU 220 at the given time satisfy all of the following conditions.

| Sleep Conditions |
| --- |
| upstream_rate < upstream_rate_threshold |
| downstream_rate < downstream_rate_threshold |
| upstream_frame_gap > upstream_frame_gap_threshold |
| downstream_frame_gap > downstream_frame_gap_threshold |

It is noted that low rates and large gaps indicate a low level of activity, whereas high rates and small gaps indicate a high level of activity.

An ONU 220 is deemed to have accumulated a sufficient backlog of activity to transition to Active state at a given time, if the statistics for ONU 220 at the given time satisfy both of the following conditions.

| Wakeup Conditions |
| --- |
| upstream_buffer_occupancy > upstream_occupancy_threshold |
| downstream_buffer_occupancy > downstream_occupancy_threshold |

The various threshold parameters, upstream_rate_threshold, downstream_rate_threshold, upstream_frame_gap_threshold, downstream_frame_gap_threshold, upstream_occupancy_threshold and downstream_occupancy_threshold are configurable parameters which control transitions of ONUs 220 into Sleep and Active states.

Figure 4:
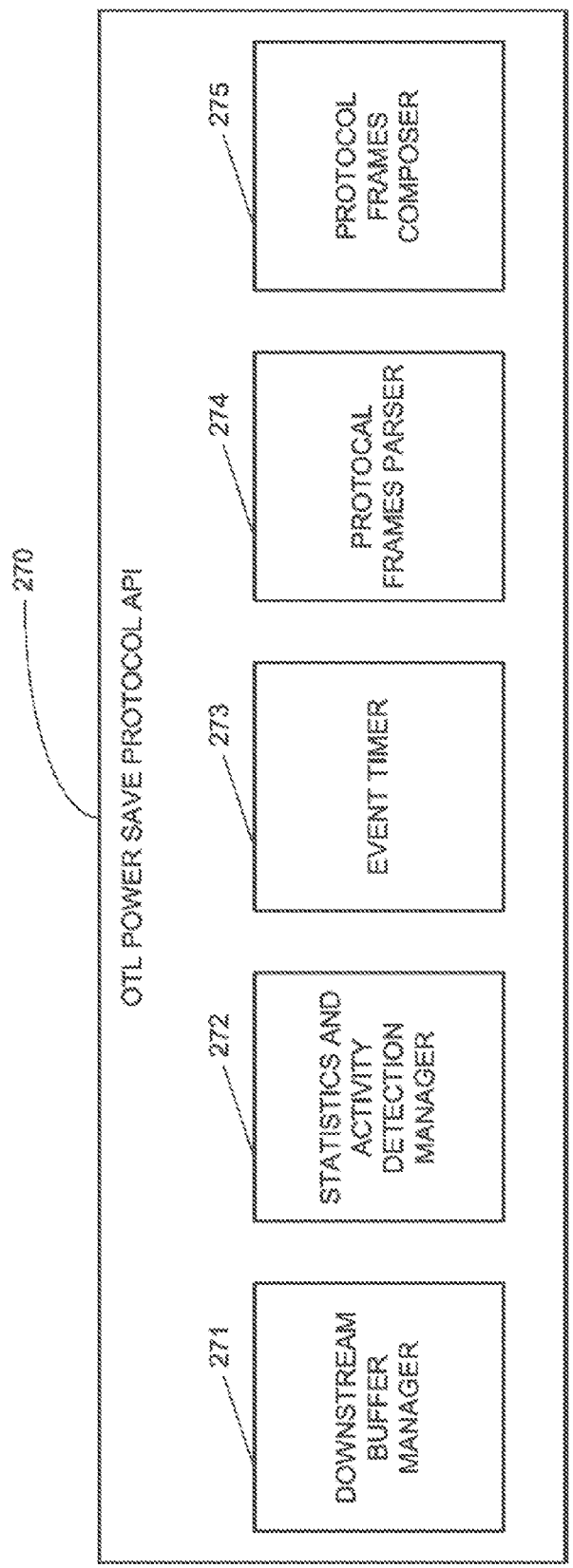
FIG. 4 is a simplified block diagram of an OLT-side power management framework, in accordance with an embodiment of the present invention.

Reference is made to FIG. 4, which is a simplified block diagram of an OLT-side power management framework 270, in accordance with an embodiment of the present invention. As seen in FIG. 4, power management framework 270 includes an OLT API 271, which provides methods and data structures for use by OLT PM module 260.

TABLE I describes methods and TABLES II and III describe respective parameter and statistical data structures provided by OLT API 271.

TABLE I

| API Methods used by OLT PM Module 260 | |
| --- | --- |
| Method | Description |
| Protocol initialization | Used to initialize internal states and variables of the PM protocol |
| Message handling | Used to process protocol messages transmitted from ONU PM modules 280 to OLT PM module 260 |
| State machine process | Used to decide whether to transition an ONU 220 from one state to another state. OLT PM module 260 is responsible to subsequently call the state machine of ONU PM module 280 when this method is called. |
| Get parameters | Read the protocol parameters |
| Get statistics | Read the statistics and decisions of activity detectors 262 and 263 |
| Send message | Send a protocol message from OLT PM module 260 to an ONU PM module 280 |
| Set downstream buffer | Enable or disable downstream buffer 261 for a specific ONU. Buffer 261 is enabled for ONUs that are in Sleep state and disabled for ONUs that are in Active state. |
| Set ONU state | Used to set the next state of an ONU 220. |

TABLE II

| API Parameter Data Structures used by OLT PM Module 260 | |
| --- | --- |
| Data Structure | Description |
| ONU List | List of ONUs for which the PM protocol is implemented |
| Number of ONUs | Size of the ONU List |
| PM cycle time | Time between consecutive sleep cycles when a periodic PM protocol is implemented |
| Initiator | Flag indicating whether OLT 240 or an ONU 220 initiates a PM cycle |
| Downstream occupancy threshold | Threshold for bytes in downstream buffer 261. Used to decide if an ONU 220 should transition to Active state. |
| Downstream buffer occupancy enable | Flag indicating if downstream buffer occupancy should be used by the PM protocol logic |
| Upstream occupancy threshold | Threshold for bytes in an ONU 220 upstream buffer 281. Used to decide if ONU 220 should transition to Active state. The occupancy of ONU 220 upstream buffer is known to PM module 260 via the ONU reporting mechanism and report frames. |

TABLE II-continued

API Parameter Data Structures used by OLT PM Module 260

| Data Structure | Description |
| --- | --- |
| Upstream buffer occupancy enable | Flag indicating if upstream buffer occupancy should be used by the PM protocol logic |
| Rate threshold | Threshold rate (in bits/s) used to decide if an ONU 220 should transition to Active state. Upstream and downstream rate thresholds may have the same or different values. |
| Rate threshold enable | Flag indicating if rate threshold should be used by the PM protocol logic |
| Gaps between frames threshold | Threshold gap between consecutive frames going downstream or coming upstream from an ONU 220, measured in units of PON time quanta. Used to decide if an ONU 220 should transition to Active state. |
| Gaps between frames enable | Flag indicating if gaps between frames should be used by the PM protocol logic |

TABLE III

API Statistical Data Structures used by OLT PM Module 260

| Data Structure | Description |
| --- | --- |
| Downstream buffer occupancy | Number of bytes in downstream buffer 261 for a given ONU 220 |
| Reported bytes | Number of bytes in an ONU 220 upstream buffer 281, as reported by ONU 220 |
| Upstream rate | Arrival rate of upstream data for a given ONU 220 |
| Downstream rate | Arrival rate of downstream data for a given ONU 220 |
| Gaps between upstream frames | Gaps between arrivals of upstream data frames for a given ONU 220, measured in units of PON time quanta |
| Gaps between downstream frames | Gaps between arrivals of downstream data frames for a given ONU 220, measured in units of PON time quanta |
| ONU active | Flag indicating decision of activity detectors 262 and 263 for a given ONU 220 |
| ONU state | Current state of a given ONU 220 |

Figure 5:
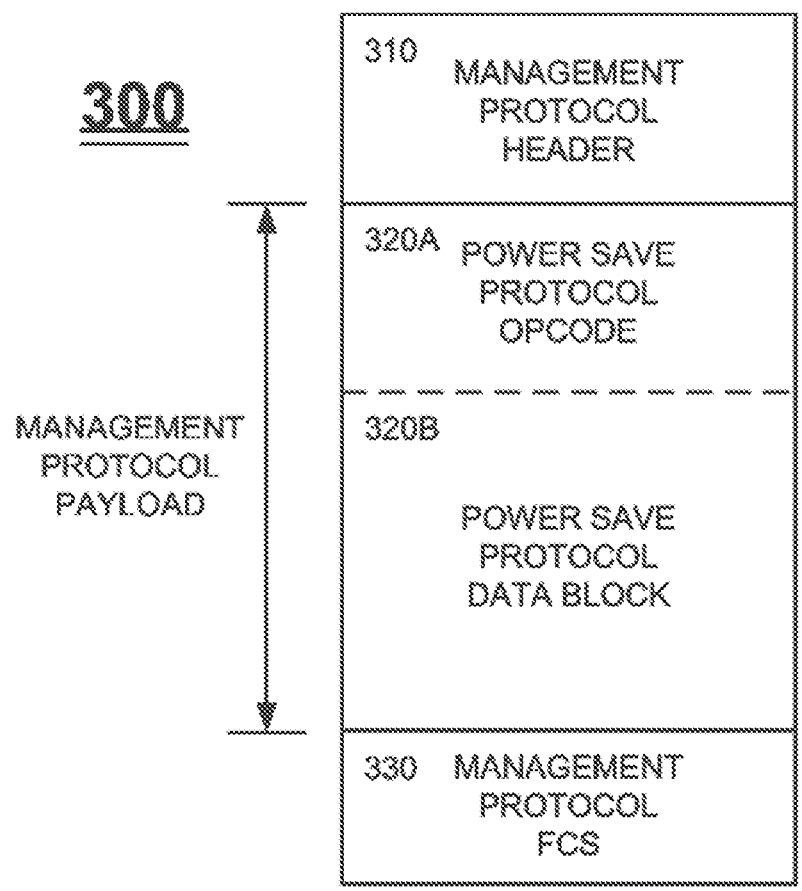
FIG. 5 is a simplified diagram of a protocol message structure, in accordance with an embodiment of the present invention.

As seen in FIG. 4, power management framework 270 further includes a protocol frames composer 276. Protocol frames composer 276 generates a PON management frame, having a PM protocol message as its payload. Reference is made to FIG. 5, which is a simplified diagram of a protocol message structure, in accordance with an embodiment of the present invention. Shown in FIG. 5 is a PON management frame 300 that carries a PM protocol message. PON management frame 300 has a management frame header 310, and a management Frame Check Sequence (FCS) 330. As seen in FIG. 5, the protocol management payload includes an OPCODE 320A and a data block 320B. The OPCODE indicates one of the following frames: SLEEP_INITIATE, SLEEP, WAKE_REQ, SLEEP_READY and WAKE_ACK. Use of these frames is described hereinbelow with reference to FIG. 8. The data block of the payload stores the next wake-up time for an ONU that is in Sleep state.

Use of protocol frames composer 276 ensures that the PM protocol is independent of management frame type. As such, the frame type may be an ethernet Operations Administration and Maintenance (OAM) frame, a Mufti-Channel Pulse Code Modulation (MPCM) frame, an ONU Management and Control Interface (OMCI) frame, a Physical Layer Operations Administration and Maintenance (PLOAM) frame or such other type of frame.

As seen in FIG. 4, power management framework 270 further includes a protocol frames parser 275. Protocol frames parser 275 extracts a PM protocol message from management frame 300, and passes it to the PM protocol.

As seen in FIG. 4, power management framework 270 further includes an event timer 274. Event timer 274 serves as the clock for the protocol state machines. OLT PM module 260 calls the process function of the protocol once per time period measured by this clock. The time period is set to be approximately an order of magnitude shorter than the quickest event period. Generally, the time period is on the order of 100 microseconds.

As seen in FIG. 4, power management framework 270 further includes a statistics and activity detection manager 273. Statistics and activity detection manager 273 is used to configure PON statistics and detection hardware in accordance with user and system defined parameters. Such parameters include:

enable upstream rate measurement;

enable downstream rate measurement;

enable upstream frames gaps measurements;

enable downstream frames gap measurements; and set rate thresholds.

As seen in FIG. 4, power management framework 270 further includes a downstream buffer manager 272. Downstream buffer manager 272 is used to enable and disable downstream buffer/queue 261 for a given ONU 220.

Figure 6:
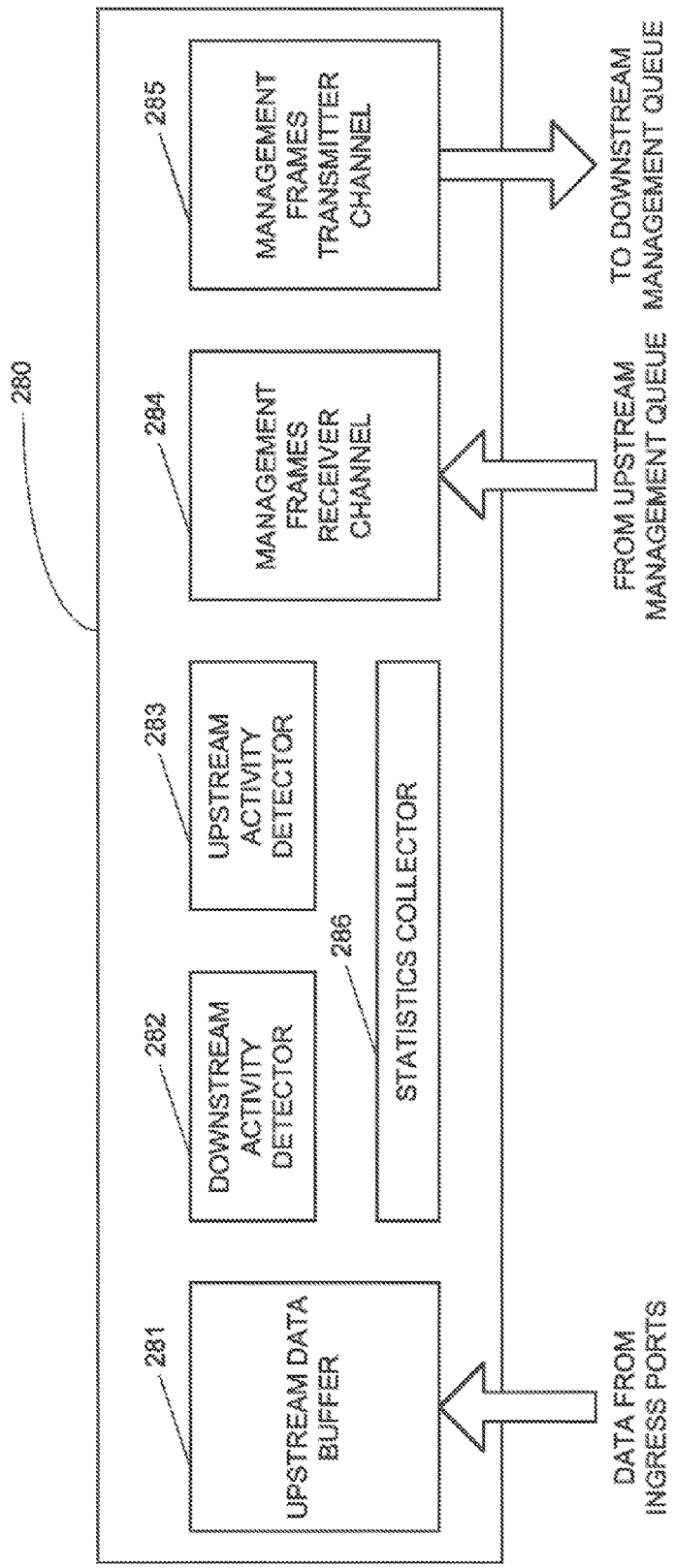
FIG. 6 is a simplified block diagram of an ONU-side power management module, in accordance with an embodiment of the present invention.

Reference is made to FIG. 6, which is a simplified block diagram of ONU PM module 280 for an ONU 220, in accordance with an embodiment of the present invention. As seen in FIG. 6, ONU PM module 280 includes an upstream data buffer 281, a downstream activity detector 282, an upstream activity detector 283, a management frames receiver channel 284, and a management frames transmitter channel 285. Upstream data buffer 281 stores incoming data from ingress ports while ONU 220 is in Sleep state. The other ONU-side components are similar to respective OLT-side components 262, 263, 264 and 265 of OLT PM module 260, which are described hereinabove.

Figure 7:
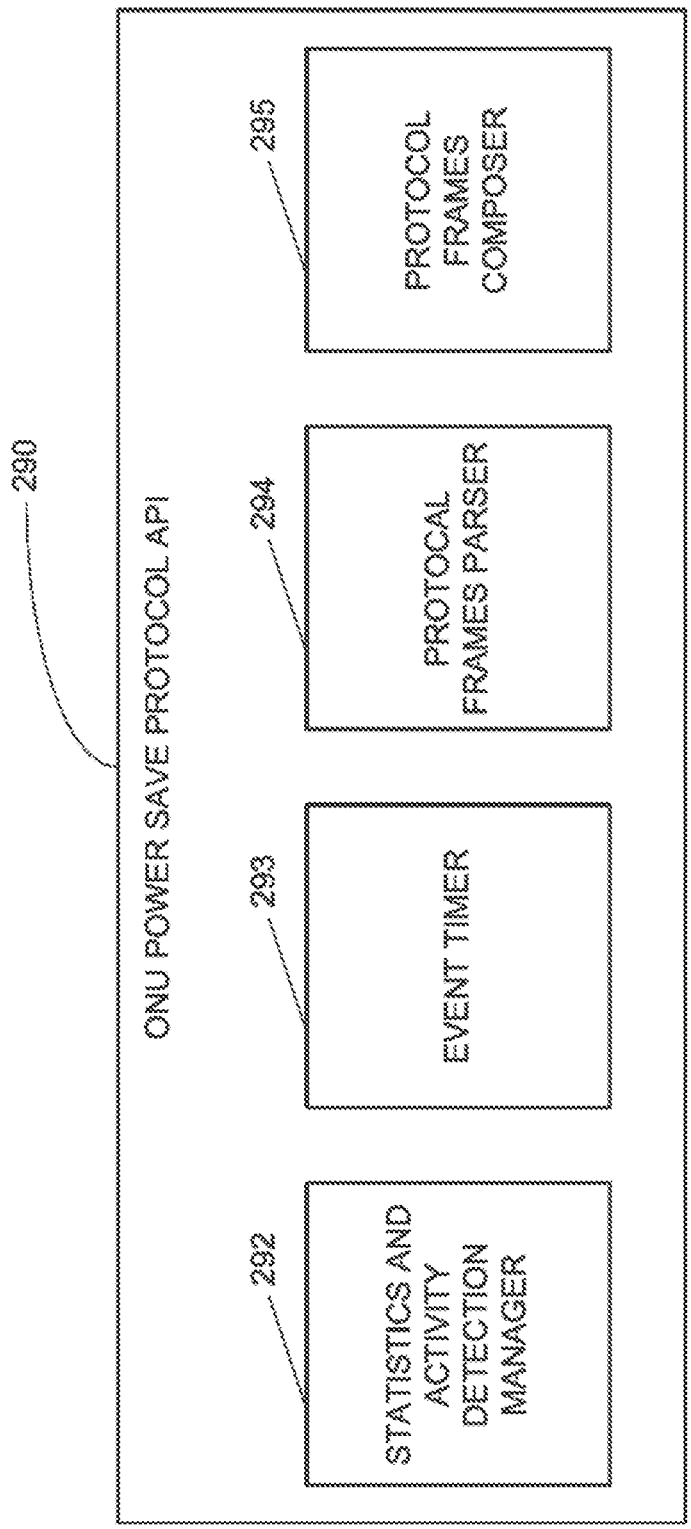
FIG. 7 is a simplified block diagram of an ONU-side power management framework, in accordance with an embodiment of the present invention.

Reference is made to FIG. 7, which is a simplified block diagram of an ONU-side power management framework 290 for an ONU 220, in accordance with an embodiment of the present invention. As seen in FIG. 7, power management framework 290 includes an ONU API 291, which provides methods and data structures for use by ONU PM module 280.

TABLE IV describes methods and TABLES V and VI describe respective parameter and statistical data structures provided by ONU API 291.

TABLE IV

API Methods used by ONU PM Module 280

| Method | Description |
| --- | --- |
| Protocol initialization | Used to initialize internal states and variables of the PM protocol |
| Message handling | Used to process protocol messages transmitted from OLT PM modules 260 to ONU PM module 280 |
| State machine process | Used to decide whether to transition ONU 220 from one state to another state |
| Get parameters | Read the protocol parameters |
| Get statistics | Read the statistics and decisions of activity detectors 282 and 283 |
| Send message | Send a protocol message from ONU PM module 280 to an OLT PM module 260 |
| Set ONU state | Used to set the next state of ONU 220. |

TABLE V

API Parameter Data Structures used by ONU PM Module 280

| Data Structure | Description |
| --- | --- |
| Initiator | Flag indicating whether OLT 240 or ONU 220 initiates a PM cycle |
| Upstream occupancy threshold | Threshold for bytes in an ONU 220 upstream buffer 281. Used to decide if ONU 220 should transition to Active state. |
| Upstream buffer occupancy enable | Flag indicating if upstream buffer occupancy should be used by the PM protocol logic |
| Rate threshold | Threshold rate (in bits/s) used to decide if an ONU 220 should transition to Active state. Upstream and downstream rate thresholds may have the same or different values. |
| Rate threshold enable | Flag indicating if rate threshold should be used by the PM protocol logic |
| Gaps between frames threshold | Threshold gap between consecutive frames going downstream or coming upstream from an ONU 220, measured in units of PON time quanta. Used to decide if an ONU 220 should transition to Active state. |
| Gaps between frames enable | Flag indicating if gaps between frames should be used by the PM protocol logic |

TABLE VI

API Statistical Data Structures used by ONU PM Module 280

| Data Structure | Description |
| --- | --- |
| Upstream rate | Arrival rate of upstream data for ONU 220 |
| Bytes in upstream | Occupancy (in bytes) of ONU upstream buffer buffer |
| Downstream rate | Arrival rate of downstream data for ONU 220 |
| Gaps between upstream frames | Gaps between arrivals of upstream data frames for ONU 220, measured in units of PON time quanta |
| Gaps between downstream frames | Gaps between arrivals of downstream data frames for ONU 220, measured in units of PON time quanta |
| ONU state | Current state of ONU 220 |

As seen in FIG. 7, power management framework 290 further includes a statistics and activity detection manager 293, an event timer 294, a protocol frames parser 295, and a protocol frames composer 296. These ONU-side components are similar to respective OLT-side components 273, 274, 275 and 276 of power management framework 270, which are described hereinabove.

Figure 8:
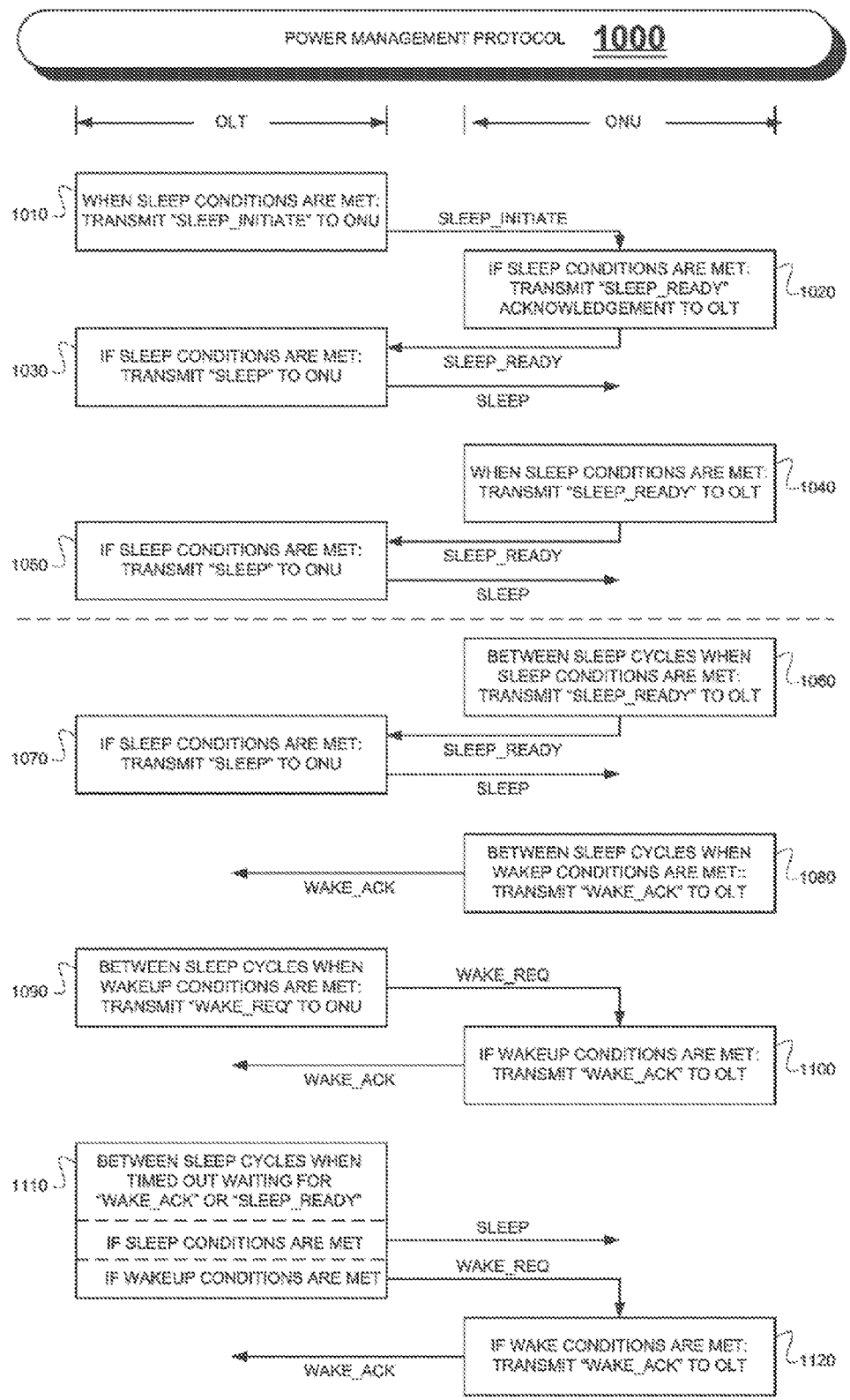
FIG. 8 is a simplified flow chart of a protocol for power management, in accordance with an embodiment of the present invention.

Reference is made to FIG. 8, which is a simplified flow chart of a PM protocol, in accordance with an embodiment of the present invention. The PM protocol runs on the OLT-side and the ONU-side of PON 200. OLT PM module 260 and ONU PM modules 280 use the PM protocol via the respective OLT API 271 and ONU API 291. The PM protocol on the OLT-side includes protocol state machines for the respective ONUs 220, and protocol message handlers and senders for the respective ONUs. Each PM protocol on the ONU-side includes a protocol state machine and a protocol message handler and sender.

Each ONU may be in one of three states; namely, an Active state, which is its normal operational mode, a Sleeping state, which is a low power mode, and a "Waking Up" state, which is an intermediate state between sleep cycles. During the Waking Up state, ONU PM module 280 sends a report regarding its upstream buffer occupancy to OLT PM module 260. The PM protocol includes the following messages, used for communication between OLT 240 and an ONU 220.

SLEEP_INITIATE—sent by OLT 240 to a specific ONU 220 to indicate that OLT 240 is initiating a sleep cycle for ONU 220

SLEEP—sent by OLT 240 to a specific ONU 220 to instruct ONU 220 to transition to Sleep state WAKE_REQ—sent by OLT 240 to a specific ONU 220 to transition to Active state SLEEP_READY—sent by an ONU 220 to OLT 240 to indicate that ONU 220 is ready to transition to Sleep state WAKE_ACK—sent by an ONU 220 to OLT 240 in indicate that ONU 220 has transitioned to Active state FIG. 8 is divided into two columns. The left column indicates operations performed by OLT 240, and the right column indicates operations performed by an ONU 220. FIG. 8 is further divided, by dashed lines, into a top portion and a bottom portion.

The top portion of FIG. 8 shows the PM protocol for an OLT-initiated sleep transition for an ONU 220 (operations 1010-1030), and an ONU-initiated sleep transition for ONU 220 (operations 1040 and 1050). At operation 1010, OLT 240 checks the sleep conditions described hereinabove with reference to activity detectors 262 and 263. If the sleep conditions are satisfied, OLT 240 sends a SLEEP_INITIATE message to ONU 220. At operation 1020, ONU 220 receives the SLEEP_INITIATE message and checks the sleep conditions. If the sleep conditions are satisfied, ONU 220 sends a SLEEP_READY message to OLT 240. If the sleep conditions are not satisfied, ONU 220 ignores the SLEEP_INTIATE message. At operation 1030, OLT 240 receives the SLEEP_READY message. OLT 240 checks the sleep conditions. If the sleep conditions are satisfied, OLT 240 sends a SLEEP message to ONU 220, with a next wakeup time. When ONU 220 receives the SLEEP message, it transitions to Sleep state until the next wakeup time. If the sleep conditions are not satisfied, OLT 240 ignores the SLEEP_READY message.

At operation 1040, an ONU 220 checks the sleep conditions. If the sleep conditions are satisfied, ONU 220 sends a SLEEP_READY message to OLT 240. At operation 1050, OLT 240 receives the SLEEP_READY message. OLT 240 checks the sleep conditions. If the sleep conditions are satisfied, OLT 240 sends a SLEEP message to ONU 220, with a next wakeup time. When ONU 220 receives the SLEEP message, it transitions to Sleep state until the next wakeup time. If the sleep conditions are not satisfied, OLT 240 ignores the SLEEP_READY message.

When ONU 220 is in Sleep state, it remains in this state until the next wakeup time, at which time ONU 220 transitions to Waking Up state.

The bottom portion of FIG. 8 shows the PM protocol when ONU 220 is in Waking Up state. At operation 1060, ONU 220 checks the sleep conditions. If the sleep conditions are satisfied, ONU sends a SLEEP-READY message to OLT 240. At operation 1070, OLT 240 receives the SLEEP_READY message. OLT 240 checks the sleep conditions. If the sleep conditions are satisfied, OLT 240 sends a SLEEP message to ONU 220, with a next wakeup time. When ONU 220 receives the SLEEP message, it transitions to Sleep state until the next wakeup time. If the sleep conditions are not satisfied, OLT 240 ignores the SLEEP_READY message.

At operation 1080, ONU 220 checks the wakeup conditions described hereinabove with reference to activity detectors 262 and 263. If the wakeup conditions are satisfied, ONU 220 sends a WAKE_ACK message to OLT 240 and transitions to Active state. When OLT 240 receives the WAKE_ACK message, it knows that ONU 220 is in Active state.

At operation 1090, OLT 240 checks the wakeup conditions. If the wakeup conditions are satisfied, OLT 240 sends a WAKE_REQ message to ONU 220. At operation 1100, ONU 220 receives the WAKE_REQ message. ONU 220 checks the wakeup conditions. If the wakeup conditions are satisfied, ONU 220 transitions to Active state, and sends a WAKE_ACK message to OLT 240. When OLT 240 receives the WAKE_ACK message, it knows that ONU 220 is in Active state. If the wakeup conditions are not satisfied, ONU 220 ignores the WAKE_REQ message.

If a timeout period has elapsed and OLT 240 has still not received an expected SLEEP_READY or WAKE_ACK message from ONU 220, then at operation 1110 OLT 240 checks the sleep conditions. If the sleep conditions are satisfied, OLT 240 sends a SLEEP message to ONU 220. Otherwise, OLT 240 checks the wakeup conditions. If the wakeup conditions are satisfied, OLT 240 sends a WAKE_REQ message to ONU 220. At operation 1120, ONU 220 receives the WAKE_REQ message. ONU 220 checks the wakeup conditions. If the wakeup conditions are satisfied, ONU 220 transitions to Active state, and sends a WAKE_ACK message to OLT 240. When OLT 240 receives the WAKE_ACK message, it knows that ONU 220 is in Active state. If the wakeup conditions are not satisfied, ONU 220 ignores the WAKE_REQ message.

Figure 9:
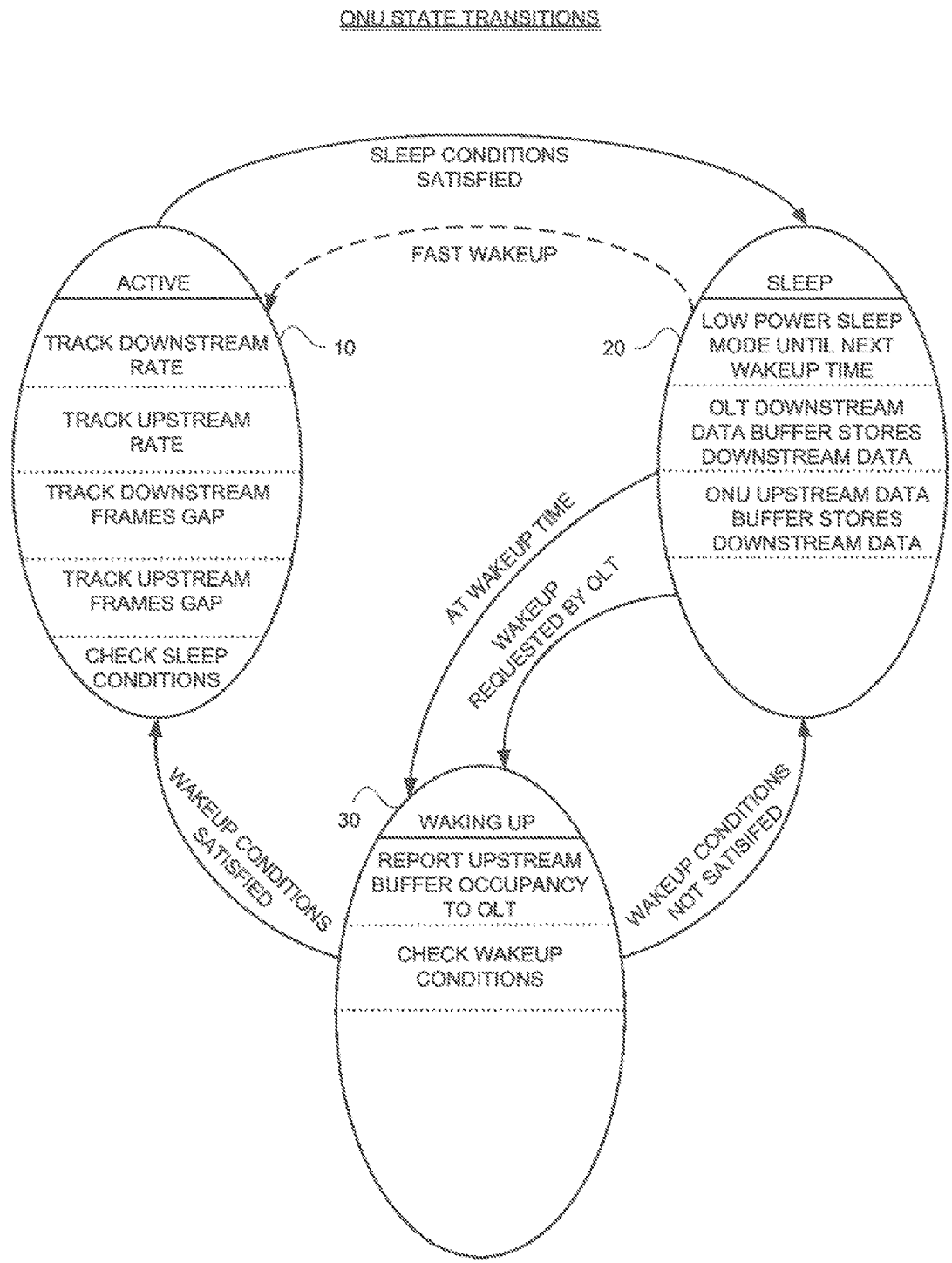
FIG. 9 is a simplified power management state transition diagram for an ONU, in accordance with an embodiment of the present invention.

Reference is made to FIG. 9, which is a simplified power management state transition diagram for an ONU 220, in accordance with an embodiment of the present invention. Shown in FIG. 9 are the three ONU states; namely, Active state 10, Sleep state 20 and Waking Up state 30. While in Active state 10, ONU downstream and upstream activity detectors 282 and 283 track the respective upstream and downstream data traffic rates for ONU 220, and the respective upstream and downstream frame gaps for ONU 220, and use the rates and gaps to check whether or not the sleep conditions for ONU 220 are satisfied. OLT activity detectors 262 and 263 also track these respective rate and gaps, and use the rates and gaps to check whether or not the sleep conditions for ONU 220 are satisfied. When either activity detectors 262 and 263, or activity detectors 282 and 283, determine that the sleep conditions are satisfied, then ONU 220 transitions into Sleep state 20 by a respective OLT-initiated or ONU-initiated transition. The transition to Sleep state 20 includes designation of a next wakeup time.

While in Sleep state 20, ONU 220 is in a low power mode. Buffer 261 stores downstream data for ONU 220, and buffer 281 stores upstream data for ONU 220. When the wakeup time for Sleep state 20 arrives, or when ONU PM module 280 receives a wakeup request from OLT PM module 280, ONU 220 transitions to Waking Up state 30.

While in Waking Up state 30, ONU PM module 280 sends a report to OLT PM module 260 regarding the occupancy of ONU upstream data buffer 281. Activity detectors 262 and 263, and activity detectors 282 and 283 use this information to determine if the wakeup conditions are satisfied. If so, then ONU 220 transitions into Active state 10. Otherwise, ONU 220 transitions back into Sleep state 20.

As seen in FIG. 9, when ONU 220 is in Waking Up state, ONU PM module 280 sends a report regarding its upstream buffer occupancy to OLT PM module 260. Thus OLT PM module 260 is able to determine whether or not the upstream buffer occupancy exceeds its threshold, which is one of the wakeup conditions.

In an alternative embodiment of the present invention ONU 220 undergoes a "fast wakeup", which is a direct transition from Sleep state 20 to Active state 10, if local wakeup conditions are satisfied. Upon waking up, ONU PM module 280 responds to report requests from OLT PM module 260. As such, OLT PM module 280 may send report requests to ONU PM module 280 while ONU 220 is in Sleep state 20, for ONU PM module 280 to report occupancy of upstream buffer 281. Such a fast wakeup mechanism enables ONU PM module 280 to respond to local events in the middle of a sleep cycle. Such a fast wakeup is indicated by a dashed arrow between states 20 and 10 in FIG. 9.

The present invention has broad application to power management for point-to-multipoint networks. Such applications include inter alia:

security camera networks, wherein cameras are similar to ONUs and the control center is similar to an OLT;

sensory arrays, wherein smart sensors are similar to ONUs and the control center is similar to an OLT; and smart house management, wherein home appliances are similar to ONUs and the main control computer is similar to an OLT.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A power manager for a passive optical network, comprising:
a network statistics collector, for collecting data regarding incoming and outgoing data frames transmitted to each optical network unit (ONU) in a passive optical network (PON) comprising a plurality of ONUs on the downstream side of the PON, wherein each ONU can be in at least a sleep state and an active state, and wherein the PON transmits data in packets of data frames;
a buffer for storing downstream data frames for each ONU while the ONU is in the sleep state;
an activity detector for processing the data collected by said network statistics collector to generate upstream and downstream data rates for each ONU and gaps between upstream and downstream data frames transmitted to each ONU; and
a protocol manager comprising a plurality of state machines for the respective plurality of ONUs, wherein each state machine governs state transition of its respective ONU to the sleep state when said activity detector indicates a low activity level for the ONU, and to the active state when said activity detector indicates a high level of activity for the ONU.

2. The power manager of claim 1 wherein said protocol manager sets a respective wakeup time for each respective ONU whose state machine indicates that the ONU should transition to the sleep state.

3. The power manager of claim 1 wherein said activity detector indicates a low level of activity when the upstream and downstream data rates are below respective upstream and downstream threshold rates, and when the upstream and downstream gaps between data frames are above respective upstream and downstream threshold gaps.

4. The power manager of claim 1 wherein said network statistics collector collects data regarding buffer occupancy for each ONU that is in the sleep state, and wherein said activity detector indicates a high level of activity when the buffer occupancy is above a threshold occupancy.

5. The power manager of claim 1 further comprising a frames composer for generating management data frames encapsulating protocol messages related to state transitions of an ONU.

6. A method for managing power of a passive optical network, comprising:

collecting data regarding incoming and outgoing data frames transmitted to each optical network units (ONU) in a passive optical network (PON) comprising a plurality of ONUs on the downstream side of the PON, wherein each ONU can be in at least a sleep state and an active state and wherein the PON transmits data in packets of data frames;

storing downstream data frames for each ONU in a buffer, while the ONU is in the sleep state;

processing the data collected by said collecting to generate upstream and downstream data rates for each ONU and gaps between upstream and downstream data frames transmitted to each ONU; and determining state transitions of each ONU, wherein an ONU transitions to the sleep state when the indicators of activity level for the ONU indicate a low activity level for the ONU, and an ONU transitions to the active state when the indicators of activity level for the ONU indicate a high level of activity for the ONU.

7. The method of claim 6, wherein said determining state transitions further determines a wakeup time for each ONU that transitions to the sleep state.

8. The method of claim 6 wherein said processing indicates a low level of activity when the upstream and downstream data rates are below respective upstream and downstream threshold rates, and when the upstream and downstream gaps between data frames are above respective upstream and downstream threshold gaps.

9. The method of claim 6 wherein said collecting data collects data regarding the buffer occupancy for each ONU that is in the sleep state, and wherein said processing indicates a high level of activity when the buffer occupancy is above a threshold occupancy.

10. The method of claim 6 further comprising generating management data frames encapsulating protocol messages related to said determining state transitions.

11. A system for power management of a passive optical network, comprising:

a plurality of optical network units (ONUs) on the downstream side of a passive optical network (PON), wherein each ONU transmits data in packets of data frames, wherein each ONU can be in at least a sleep state and an active state, and wherein each ONU comprises:

an ONU network statistics collector, for collecting data regarding incoming and outgoing data frames at the ONU;

an ONU activity detector for processing the data collected by said network statistics collector to generate indicators of activity level of the ONU; and an ONU protocol manager comprising a state machine for the ONU, wherein the state machine governs state transition of the ONU to the sleep state when said ONU activity detector indicates a low activity level for the ONU; and an optical line terminal (OLT) on the upstream side of the PON, comprising:

an OLT network statistics collector, for collecting data regarding traffic at each of the ONUs;

an OLT buffer for storing downstream data frames for each ONU while the ONU is in the sleep state;

an OLT activity detector for processing the data collected by said OLT network statistics collector to generate upstream and downstream data rates for each ONU and gaps between upstream and downstream data frames transmitted to each ONU; and an OLT protocol manager comprising a plurality of state machines for the respective plurality of ONUs, wherein each state machine governs state transition of its respective ONU to the active state when said OLT activity detector indicates a high level of activity for the ONU.

12. The system of claim 11 wherein each ONU can be in an intermediate waking up state, and wherein each ONU in the sleep state transitions to the waking up state when a designated wakeup time has arrived.

13. The system of claim 12 wherein each ONU further comprises an ONU buffer for storing upstream data frames for each ONU while the ONU is in the sleep state, wherein each ONU reports the occupancy of said ONU buffer to said OLT when the ONU is in the waking up state, and wherein said OLT activity detector also processes the occupancy of said ONU buffer to generate the indicators of activity level for the ONU.

14. The system of claim 12 wherein said state machine of said ONU protocol manager governs state transition of the ONU from the sleep state to the wakeup state when said ONU activity detector indicates a high activity level for the ONU.

15. The system of claim 12 wherein each state machine of said OLT protocol manager governs state transition of its respective ONU from the sleep state to the waking up state when said OLT activity detector indicates a high level of activity for the ONU.

16. The system of claim 11 wherein each state machine of said OLT protocol manager governs state transition of its respective ONU to the sleep state when said OLT activity detector indicates a low level of activity for the ONU.

17. The system of claim 11 wherein said state machine of said ONU protocol manager governs state transition of the ONU to the active state when said ONU activity detector indicates a high activity level for the ONU.

* * * * *